(12) United States Patent
Ikeuchi (10) Patent No.: US 9,142,366 B2
(45) Date of Patent: Sep. 22, 2015

(54) ILLUMINATION-TYPE PUSH BUTTON DEVICE

(71) Applicant: OMRON CORPORATION, Kyoto-shi (JP)

(72) Inventor: Koichiro Ikeuchi, Ichinomiya (JP)

(73) Assignee: OMRON Corporation, Kyoto (JP)

( * ) Notice: Subject to any disclaimer, the term of this patent is extended or adjusted under 35 U.S.C. 154(b) by 83 days.

(21) Appl. No.: 14/142,905

(22) Filed: Dec. 29, 2013

(65) Prior Publication Data

US 2014/0198476 A1    Jul. 17, 2014

(30) Foreign Application Priority Data

Jan. 11, 2013   (JP) ................. 2013-004036

(51) Int. Cl.
*F21V 13/02* (2006.01)
*H01H 13/02* (2006.01)
*F21V 5/00* (2015.01)

(52) U.S. Cl.
CPC .............. *H01H 13/023* (2013.01); *F21V 5/008* (2013.01); *F21V 13/02* (2013.01)

(58) Field of Classification Search
CPC ...... H01H 13/023; H01H 13/02; F21V 13/00; F21V 13/02; F21V 33/00; F21V 2008/00; F21V 5/002; F21V 5/004; F21V 5/005; F21V 5/007; F21V 5/008; F21V 5/04; G02B 13/003
See application file for complete search history.

(56) References Cited

U.S. PATENT DOCUMENTS 8,899,766 B2 * 12/2014 Ikeuchi .................... 362/23.05
2013/0277191 A1 * 10/2013 Trolese et al. .............. 200/501

FOREIGN PATENT DOCUMENTS

| JP | 2004355958 A | 12/2004 |
|---|---|---|
| JP | 2010-033860 | 2/2010 |
| JP | 2010146988 A | 7/2010 |
| JP | 2013004036 A | 1/2013 |

* cited by examiner

*Primary Examiner* — Bao Q Truong
(74) *Attorney, Agent, or Firm* — Klarquist Sparkman, LLP (57) ABSTRACT

An illumination-type push button device including a board for light source, a diffusing lens having a dome shape, a first light source portion and a second light source portion, and a light guide member, where the diffusing lens is configured such that light of the second light source portion enters the diffusing lens from a back surface, and is diffused from a front surface of the diffusing lens, thereby being irradiated to an outside of the device, and the light guide member is configured such that light of the first light source portion enters the light guide member from an incident surface opposed to the first light source portion on the one end side of the light guide member to be guided inside the light guide member, and exits from an outgoing surface on the other end side of the light guide member, thereby being irradiated to the outside.

3 Claims, 5 Drawing Sheets

ILLUMINATION-TYPE PUSH BUTTON DEVICE

CROSS REFERENCE TO RELATED APPLICATION

This application is related to and claims the benefit of Japanese Patent Application Number 2013-004036 filed on 11 Jan. 2013, the contents of which are herein incorporated by reference in their entirety.

BACKGROUND OF THE INVENTION

The present invention relates to an illumination-type push button device attached to a game machine such as a pachinko machine, a pachinko slot machine and the like.

RELATED ART

Conventionally, there has been known a game machine with an illumination-type push button device attached thereto capable of irradiating light. Irradiating light from the illumination-type push button device enhances a degree of expectancy given to a player. Such a conventional game machine can be see, for example, in Unexamined Patent Publication No. 2010-33860, 2010-146988, 2004-355958.

There has been known a technique in that in an illumination-type push button device including a first light source and a second light source, in order to restrain leakage of light of the second light source to a light path of light from the first light source, and leakage of the light of the first light source to a light path of the light from the second light source, a shielding plate (i.e., a reflective plate) is attached between the first light source and the second light source. For example, Japanese Unexamined Patent Publication No. 2010-33860, discloses a light emitting device in which a douser is attached between a light emitting element that generates light to be irradiated from a display portion and a light guide plate that guides the light, and a light emitting element that generates light to be irradiated from a switch knob. However, as in Japanese Unexamined Patent Publication No. 2010-33860, when the douser is further attached in the configuration requiring the light guide plate, there arises a problem that parts count increases.

BRIEF SUMMARY

The present invention has been devised in light of the above-described problem, and provides an illumination-type push button device capable of reducing parts count.

An illumination-type push button device configured to be attached to a game machine, is provided, the device including a board for light source, a diffusing lens having a dome shape with a convex front surface and a concave back surface, the back surface being opposed to the board for light source, a first light source portion and a second light source portion mounted on a side opposed to the diffusing lens of the board for light source, and a light guide member that is fitted in a through-hole formed in the diffusing lens so as to penetrate from a side of the back surface to a side of the front surface, is mounted on the board for light source so that one end side thereof covers the first light source portion, and is projected from the diffusing lens on another end side in a direction from the back surface to the front surface, where the diffusing lens is configured such that light of the second light source portion enters the diffusing lens from the back surface, and is diffused from the front surface of the diffusing lens, thereby being irradiated to an outside of the device, and the light guide member is configured such that light of the first light source portion enters the light guide member from an incident surface opposed to the first light source portion on the one end side of the light guide member to be guided inside the light guide member, and exits from an outgoing surface on the other end side of the light guide member, thereby being irradiated to the outside.

DETAILED DESCRIPTION

Figure 1:
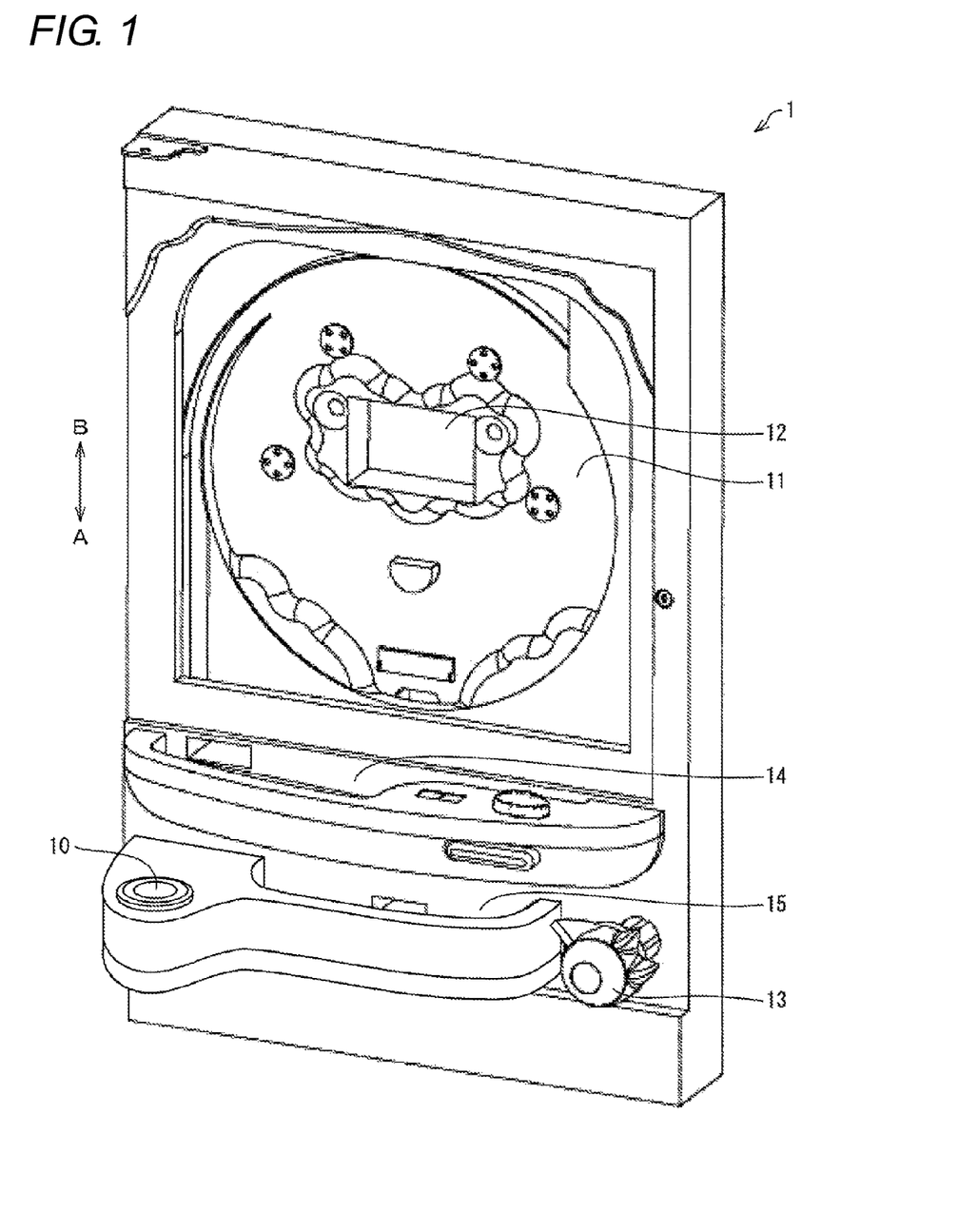
FIG. 1 is a view showing an exterior appearance of a pachinko machine including an illumination-type push button device according to one embodiment of the present invention.

Hereinafter, embodiments of the present invention will be described in detail. FIG. 1 is a view showing a pachinko machine as a game machine in an embodiment of the present invention. As shown in FIG. 1, a pachinko machine 1 includes a game area 11, a display portion 12, a handle 13, an upper tray 14, a lower tray 15, and an illumination-type push button device 10.

The game area 11 is an area where a game ball hit by the handle 13 moves. The game area 11 is covered with a glass frame (not shown) with a glass plate fitted therein. The display portion 12 is arranged around a central portion of the game area 11, and is made of, for example, a liquid crystal display device to display images for various types of rendering such as an image showing a jackpot lottery and an image showing an expectancy degree of the jackpot. The handle 13 is a device for launching the game ball, and when a user holds the handle 13 in a state where he or she rotates the handle 13, the game balls are continuously launched. In the upper tray 14, the game balls lent out by ball lending manipulation, and the game balls acquired by the game are stored. In the lower tray 15, the game balls running over the upper tray 14 are stored.

The illumination-type push button device (hereinafter, referred to as a "push button device") 10 is attached left to the lower tray 15 in the pachinko machine 1, and also referred to as a so-called chance button. For example, the push button device 10 emits light at a predetermined timing to encourage the player to perform a pressing manipulation. When the player presses the push button device 10 during light emission, a predetermined character or the like is rendered and displayed in the display portion 12.

Figure 2A:
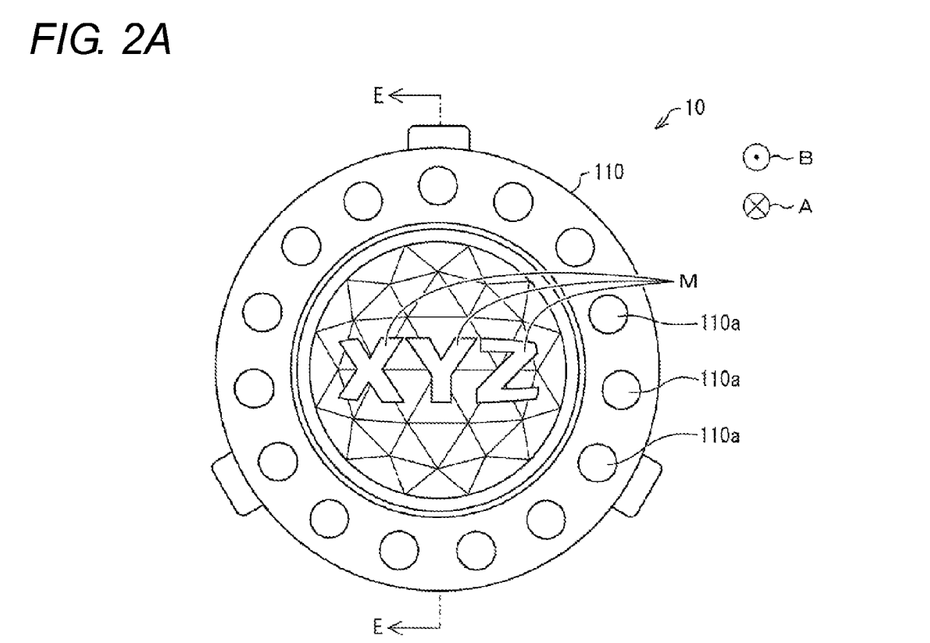
FIG. 2A is a top view of the illumination-type push button device shown in FIG. 1.
Figure 2B:
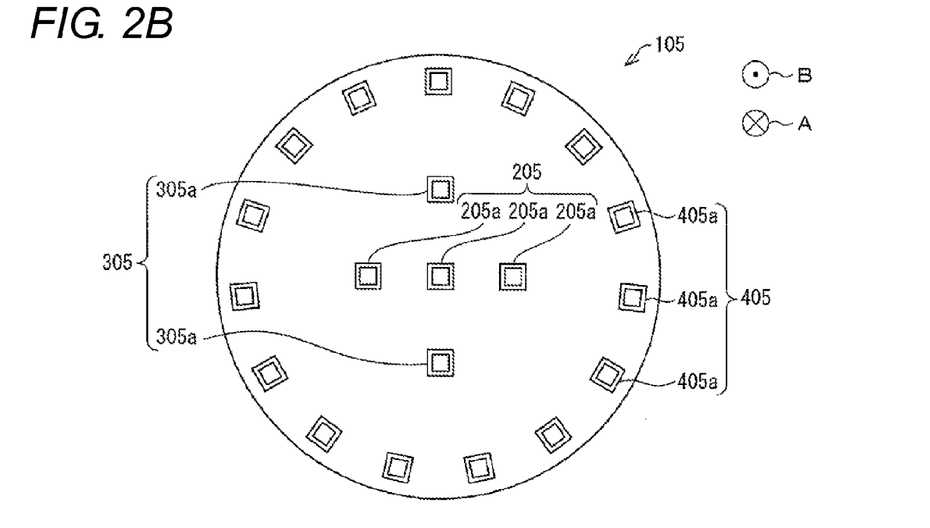
FIG. 2B is a top view showing a board for light source attached to an inside of the illumination-type push button device shown in FIG. 1.
Figure 3:
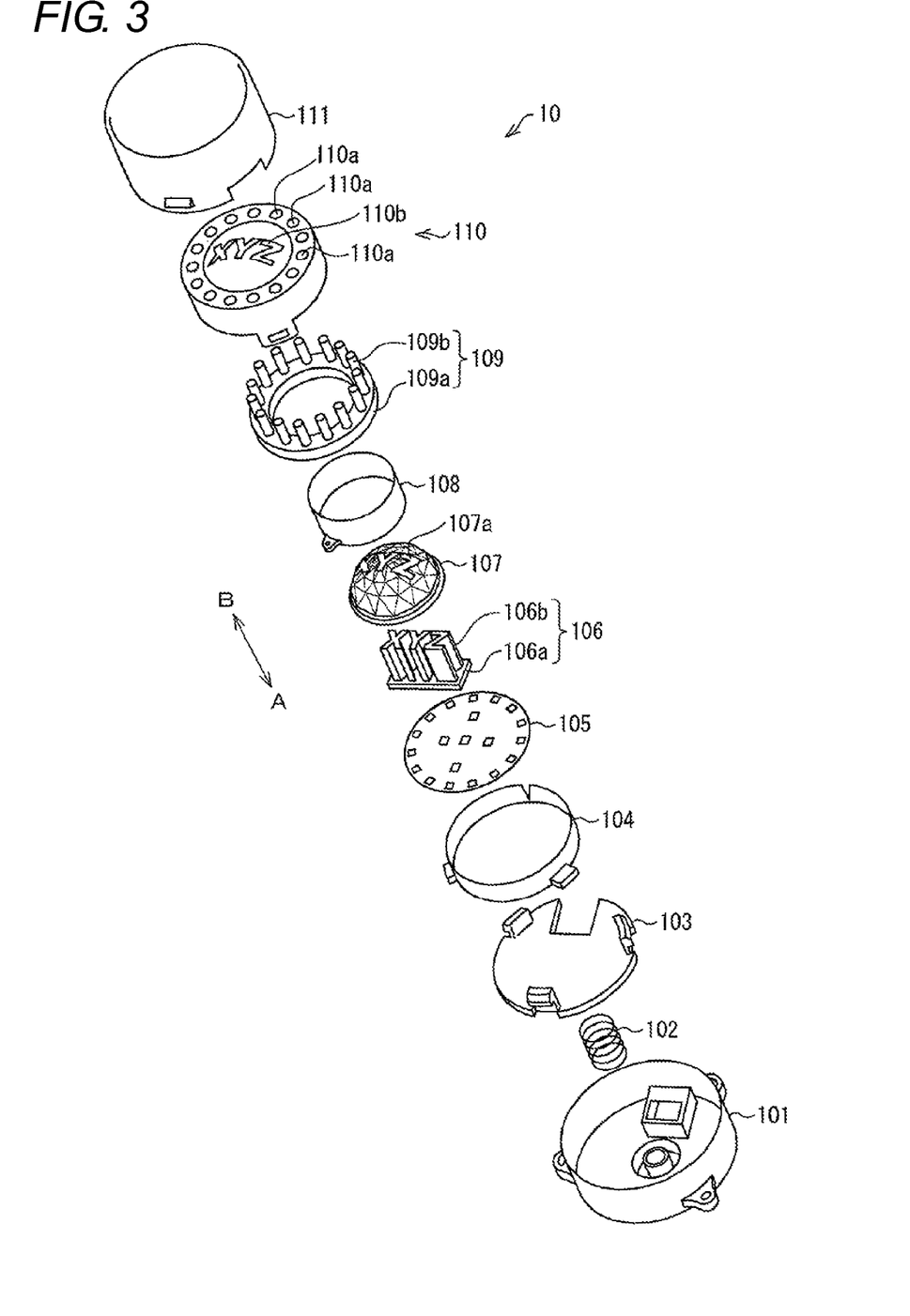
FIG. 3 is an exploded perspective view of the illumination-type push button device shown in FIG. 1.
Figure 4:
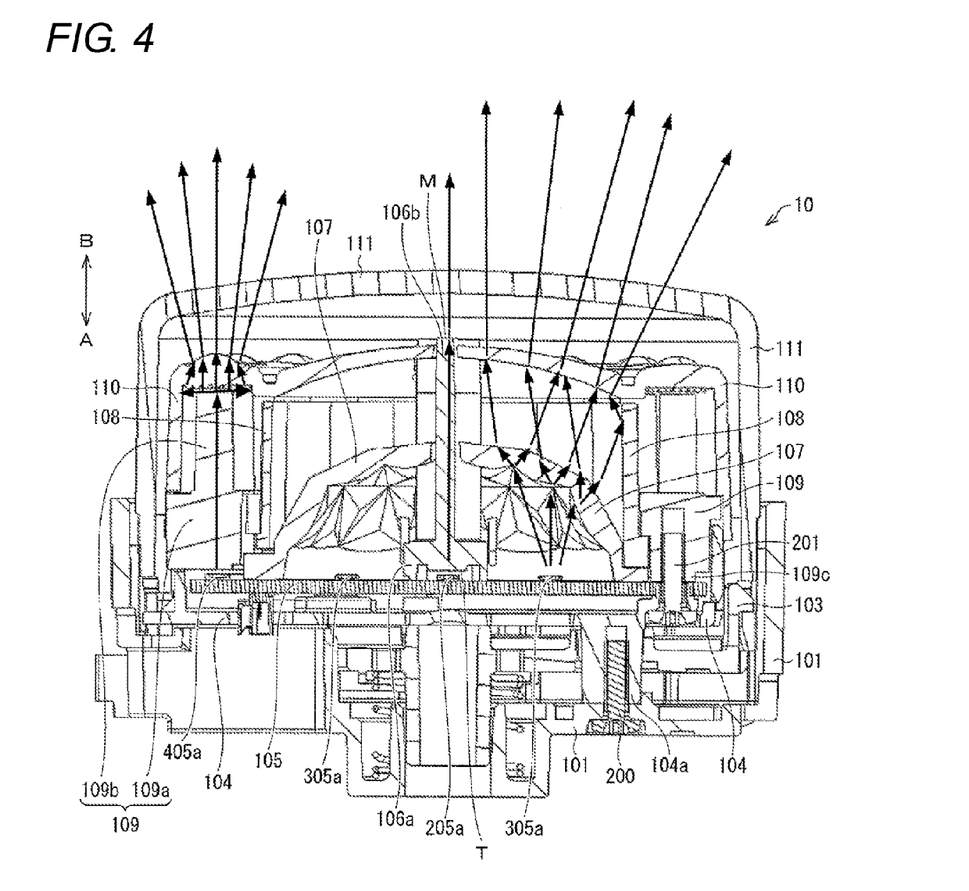
FIG. 4 is a view showing a cross section in which the illumination-type push button device is cut along line E-E in FIG. 2A.

Hereinafter, a configuration of the push button device 10 will be described in detail. FIG. 2A is a top view of the push button device 10. FIG. 2B is a top view showing a board for light source 105 attached inside the push button device 10. FIG. 3 is an exploded perspective view in which the push button device 10 is exploded. FIG. 4 is a view showing a cross section in which the push button device 10 is cut along line E-E in FIG. 2A.

As shown in FIG. 3, the push button device 10 includes a case 101, a return spring 102, a movable member 103, a base member 104, a board for light source 105, a first light guide member 106, a diffusing lens 107, a douser 108, a second light guide member 109, a double lens array 110, and a cover 111. A direction 'A' shown in FIGS. 1 to 4 is a direction in which the push button device 10 is pushed, and a direction 'B' is a direction reverse to the A direction.

The case 101 is a member into which the return spring 102 and the movable member 103 are inserted. The case 101 is a cylindrical member with a bottom surface thereof formed on an A direction side, and is made of opaque pigmented plastic. Moreover, the case 101 is screwed to the pachinko machine 1, and this allows the push button device 10 to be fixed to the pachinko machine 1.

The movable member 103 is made of tabular plastic, and is inserted into the case 101 so as to be located on a B direction side with respect to the bottom surface of the case 101. The return spring 102 is a spring inserted between the case 101 and the movable member 103 so as to be expandable/shrinkable in the A direction and in the B direction.

Next, the cover 111 will be described. The cover 111 is a cylindrical member with an upper surface thereof formed on the B direction side (without a bottom surface formed on the A direction side), and is made of transparent plastic. An end portion on the A direction side of the cover 111 is fixed to the movable member 103. In the present embodiment, projections are provided in the movable member 103 and engagement portions to be engaged with the projections are provided in the end portion on the A direction side of the cover 111, by which the cover 111 is fixed to the movable member 103. However, causing the cover 111 and the movable member 103 to adhere to each other may allow the cover 111 to be fixed to the movable member 103.

According to the above-described configuration, when the cover 111 is pushed in the A direction by a hand of the player, the return spring 102 is compressed, and the cover 111 and the movable member 103 are moved in the A direction, while the case 101 remains still. When the player releases his or her hand from the cover 111, the cover 111 and the movable member 103 are moved in the B direction by an elastic force of the return spring 102 to return to a home position before the cover 111 is pushed, while the case 101 remains still. That is, in the push button device 10, the case 101, the return spring 102, the movable member 103, and the cover 111 have a role as a push button function portion.

Next, the base member 104, the board for light source 105, the first light guide member 106, the diffusing lens 107, the douser 108, the second light guide member 109, and the double lens array 110 will be described in order.

The base member 104 is a pedestal of the board for light source 105. The base member 104 is a cylindrical member with a bottom surface thereof formed on the A direction side, and is made of opaque pigmented plastic. An outer diameter of the base member 104 is shorter than an inner diameter of the cover 111.

The base member 104 is arranged inside the cover 111, and is fixed by a screw 200 (refer to FIG. 4) fitted in the case 101. Specifically, in the case 101, a screw hole penetrating in the A direction is formed, while in the base member 104, a projected portion 104*a* (refer to FIG. 4) projected on the A direction side, and a screw hole formed in the projected portion 104*a* are formed. In the movable member 103, a through-hole penetrates in the A direction and allows for insertion of the projected portion 104*a*. The projected portion 104*a* is inserted into the through-hole of the movable member 103 so as to leave space between the through-hole of the movable member 103 and the projected portion 104*a*, and the screw 200 is fitted in the screw hole of the case 101 and the screw hole of the projected portion 104*a* of the base member 104. This enables the movable member 103 to move in the A direction or in the B direction, and keeps the base member 104 in a state fixed to the screw 200. That is, even when the cover 111 is pushed to thereby move the cover 111 and the movable member 103 in the A direction or in the B direction, the base member 104 is kept in a still state similarly to the case 101.

The board for light source 105 is a disk-like printed board arranged on the B direction side with respect to the bottom surface of the base member 104. The board for light source 105 is fixed by a screw 201 (refer to FIG. 4) fitted in the base member 104. Specifically, a screw hole (not shown in FIG. 3) penetrating in the A direction is formed in each of the base member 104 and the board for light source 105, and the screw 201 is fitted in the screw hole of the base member 104 and the screw hole of the board for light source 105. This keeps the board for light source 105 in a still state similarly to the base member 104 and the case 101 regardless of the pressing manipulation of the player The board for light source 105 is for mounting light sources of the push button device 10 on, and has a plurality of LED elements mounted on a surface thereof on the B direction side as the light sources. FIG. 2B is a view showing the surface of the board for light source 105 on the B direction side.

As shown in FIG. 2B, the board for light source 105 has a first light source portion 205, a second light source portion 305, and a third light source portion 405.

The first light source portion 205 is made up of three LED elements 205*a* mounted so as to lie on a straight line in an area covered with the first light guide member 106 of a letter type shown in FIG. 3. The three LED elements 205*a* are arranged at equal spaces, and the central LED element 205*a* of the three LED elements 205*a* is mounted at a central position of the board for light source 105.

The second light source portion 305 is made up of a pair of LED elements 305*a* mounted on the board for light source 105. Specifically, as shown in FIG. 4, in the board for light source 105, the LED elements 305*a* are mounted between a site where the first light guide member 106 (106*a*, 106*b*) is mounted, and a site where the second light guide member 109 is mounted. Moreover, one of the LED elements 305*a* of the second light source portion 305 and the other LED element 305*a* are arranged in opposition to each other with the first light guide member 106 interposed.

As shown in FIG. 2B, the third light source portion 405 is made up of a plurality of LED elements 405*a* mounted on the board for light source 105 so as to lie side-by-side at equal spaces along an outer circumference of the board for light source 105. Moreover, the respective LED elements 405*a* included in the third light source portion 405 are arranged at positions where they face the second light guide member 109 on the B direction side in the board for light source 105.

As shown in FIG. 4, the LED elements 205*a*, 305*a*, 405*a* mounted on the board for light source 105 irradiate light from the A direction side to the B direction side. Bold arrows shown in FIG. 4 (arrows other than arrows indicating the A direction and the B direction) indicate traveling directions of the light irradiated from the LED elements 205*a*, 305*a*, 405*a*.

The first light guide member 106 is an optical member made of a material that totally reflects the light (e.g., acrylic resin), and having transparency. The first light guide member 106 is mounted on the board for light source 105 so as to cover the LED elements 205a of the first light source portion 205.

As shown in FIG. 3, the first light guide member 106 has a tabular incident portion 106a formed on the A direction side to cover the LED elements 205a of the first light source portion 205, and columnar upright portions 106b extending from the incident portion 106a to the B direction.

In the incident portion 106a, in a surface on the side of the board for light source 105 (on the A direction side), there is formed a recess to form a sealed space between the board for light source 105 and the incident portion 106a. The incident portion 106a is mounted on the board for light source 105 so that the three LED elements 205a of the first light source portion 205 are located between the recess of the incident portion 106a and the board for light source 105. This allows the LED elements 205a of the first light source portion 205 to be sealed by the board for light source 105 and the incident portion 106a, as shown in FIG. 4. The sealed space formed between the board for light source 105 and the incident portion 106a is continuous, and the three LED elements 205a of the first light source portion 205 are thus arranged in the same sealed space.

Moreover, as shown in FIG. 4, in the incident portion 106a, on the surface on the side of the LED elements 205a, projections T projected toward the LED elements 205a are formed. Moreover, the same number of projections T as the LED elements 205a are formed.

In the upright portions 106b of the first light guide member 106, end surfaces on the B direction side are outgoing surfaces M as shown in FIGS. 2A and 4. The upright portions 106b are columnar portions in each of which a cross section taken along a plane perpendicular to the B direction have the same letter shape as the outgoing surface M. The same number of upright portions 106b as the LED elements 205a included in the first light source portion 205 are formed. Specifically, in order from the left side in FIG. 3, the upright portion 106b representing a shape of "X", the upright portion 106b representing a shape of "Y", and the upright portion 106b representing a shape of "Z", lie side-by-side.

Next, relationships between the LED elements 205a of the first light source portion 205 and the upright portions 106b of the first light guide member 106 will be described in detail. In the push button device 10, as shown in FIG. 4, one of the LED elements 205a, one of the projections T, and one of the upright portions 106b lie side-by-side in the B direction. That is, for each of the LED elements 205a, one of the projections T and one of the upright portions 106b are provided at a position directed from the LED element 205a to the B direction.

As shown in FIG. 4, each of the LED elements 205a is opposed to the projection T located in the direction from the LED elements 205a toward the B direction, and a surface opposed to the LED element 205a in the projection T is an incident surface from which the light of the LED element 205a enters. Moreover, the light entering from this incident surface is guided straight in the B direction by the upright portion 106b located in the direction from this incident surface toward the B direction, and exits from the outgoing surface M, which is the end surface on the B direction side of the upright portion 106b.

Thereby, for a user viewing the push button device 10 from the B direction side to the A direction side, as shown in FIG. 2A, the light is irradiated from the outgoing surfaces M of the upright portions 106b having the shapes of "XYZ", so that the user can manifestly recognize the shapes of the "XYZ".

Moreover, in the present embodiment, the outgoing surfaces M shown in FIGS. 2A and 4 are subjected to surface embossing processing. This enables the light emitted from the outgoing surfaces M to be diffused, thereby emphasizing the letter-shaped outgoing surfaces M to the user.

Next, the diffusing lens 107 will be described. As shown in FIGS. 3 and 4, the diffusing lens 107 is a transparent optical member of a dome type with a convex front surface and a concave back surface, and diffusely emits, from the front surface, light entering from the back surface, and the diffusing lens 107 is made of acrylic resin having transparency. Moreover, as shown in FIGS. 3 and 4, the diffusing lens 107 has a shape in which a plurality of inclined planes are arrayed.

The diffusing lens 107 is mounted on the board for light source 105 so that the concave back surface is opposed to the side of the board for light source 105 where the LED elements are mounted. That is, with the diffusing lens 107, the surface thereof on the A direction side is the concave back surface, and the surface on the B direction side is the convex front surface.

Moreover, since the diffusing lens 107 is of the dome type in which the surface on the A direction side is concave and the surface on the B direction side is convex, an end portion on the A direction side is a circular edge, as shown in FIG. 3. The diffusing lens 107 is mounted on the board for light source 105 so as to firmly attach this circular edge to the board for light source 105. As shown in FIG. 4, the circular edge of the diffusing lens 107 is located on a central side of the board for light source 105 with respect to the respective LED elements 405a of the third light source portion 405 in the board for light source 105, and on an outer circumferential side of the board for light source 105 with respect to the respective LED elements 205a of the first light source portion 205 and the respective LED elements 305a of the second light source portion 305.

Furthermore, as shown in FIG. 3, in the diffusing lens 107, through-holes 107a penetrating from the side of the back surface to the side of the front surface are formed. Contours of the through-holes 107a have the same letter shapes as the letter shapes of the cross sections of the upright portions 106b and the outgoing surfaces M of the first light guide member 106, and areas thereof are made slightly larger than those of the cross sections of the upright portions 106b so as to fit the upright portions 106b in a state having play.

As shown in FIG. 4, the first light guide member 106 is mounted on the board for light source 105 in a state where the incident portion 106a covers the respective LED elements 205a of the first light source portion 205, and the upright portions 106b are fitted in the through-holes 107a. The upright portions 106b of the first light guide member 106 are fitted in the through-holes 107a of the diffusing lens 107 in the state having play with respect to the diffusing lens 107 without being caused to adhere to the diffusing lens 107 with an adhesive or the like.

Furthermore, as shown in FIG. 4, the diffusing lens 107 is located in the direction from the LED elements 305a of the second light source portion 305 toward the B direction, and the LED elements 305a and the back surface of the diffusing lens 107 are opposed to each other. This allows the light emitted from the LED elements 305a of the second light source portion 305 to enter the diffusing lens 107 from the back surface of the diffusing lens 107, and diffuse from the front surface of the diffusing lens 107. Moreover, since the light of the second light source portion 305 is totally reflected by the first light guide member 106, even if it is irradiated to wall surfaces of the first light guide member 106, the incidence to the first light guide member 106 can be prevented.

Next, the douser 108 will be described. The douser 108 is a hollow cylindrical member, and a light reflective member in which an outer circumferential surface and an inner circumferential surface are mirror surfaces.

As shown in FIGS. 3 and 4, the douser 108 is attached between the diffusing lens 107 and the second light guide member 109. That is, the first light source portion 205 (the LED elements 205a), the first light guide member 106, the second light source portion 305 (the LED elements 305a), and the diffusing lens 107 are arranged on an inner circumferential side of the douser 108, and the third light source portion 405 (the LED elements 405a) and the second light guide member 109 are arranged on an outer circumferential side of the douser 108.

This restrains the light emitted from the first light source portion 205 and the second light source portion 305, which are located on the inner circumferential side of the douser 108, from leaking to a light path of the light traveling on the outer circumferential side of the douser 108 (i.e., from a light path of the light of the third light source portion 405), and restrains the light emitted from the third light source portion 405, which is located on the outer circumferential side of the douser 108, from leaking to light paths of the light traveling on the inner circumferential side of the douser 108 (i.e., from the light paths of the light of the first light source portion 205 and the second light source portion 305). For example, as shown in FIG. 4, even if the light emitted from the LED elements 305a of the second light source portion 305 and diffused in the diffusing lens 107 heads for the second light guide member 109, the light does not reach the second light guide member 109, but is reflected at the douser 108 toward the B direction side.

Next, the second light guide member 109 will be described. The second light guide member 109 is an optical member made of a material that totally reflects the light (e.g., acrylic resin), and having transparency. The second light guide member 109 is mounted on the board for light source 105 so as to be located on the B direction side of the LED elements 405a of the third light source portion 405. This allows the LED elements 405a of the third light source portion 405 to be arranged between the board for light source 105 and the second light guide member 109, as shown in FIG. 4.

As shown in FIGS. 3 and 4, the second light guide member 109 has a ring-like incident portion 109a that is formed on the A direction side and is opposed to the LED elements 405a of the third light source portion 405, and rod-like upright portions 109b extending from the incident portion 109a to the B direction.

In a surface of the incident portion 109a on the A direction side, in portions not opposed to the LED elements 405a, projected portions 109c (refer to FIG. 4) project in the A direction with respect to portions opposed to the LED elements 405a are formed. These projected portions 109c function as supporting columns to support the second light guide member 109 on the board for light source 105. That is, the projected portions 109c are firmly attached to the board for light source 105, by which the second light guide member 109 is mounted on the board for light source 105 while forming spaces between the opposed portions of the incident portion 109a of the second light guide member 109 to the LED elements 405a, and the board for light source 105. That is, as shown in FIG. 4, the LED elements 405a of the third light source portion 405 are arranged in the spaces between the incident portion 109a of the second light guide member 109, and the board for light source 105.

Figure 5:
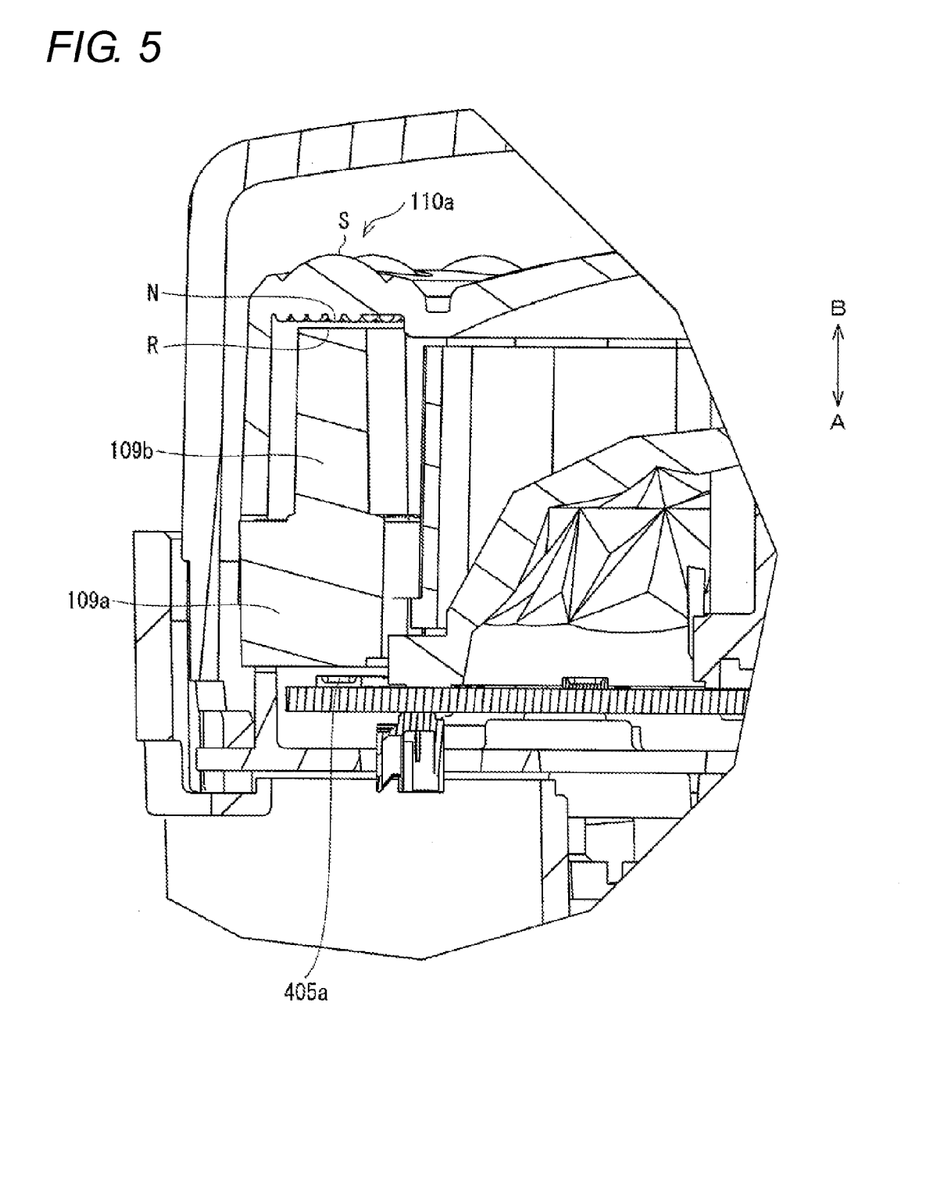
FIG. 5 is a cross-sectional view showing a lens portion of a double lens array shown in FIG. 4 in an enlarged scale.

As shown in FIGS. 3 and 4, the upright portions 109b of the second light guide member 109 are columnar portions extending from the incident portion 109a to the B direction and having end surfaces on the B direction side as outgoing surfaces R (refer to FIG. 5). The same number of upright portions 109b as the LED elements 405a are formed. Specifically, as shown in FIG. 3, the upright portions 109b lie side-by-side at equal spaces along an outer circumference of the incident portion 109a on the B direction side of the incident portion 109a. For each of the LED elements 405a, one of the upright portions 109b is arranged at a position directed from the LED element 405a in the B direction.

Next, the double lens array 110 will be described. The double lens array 110 is a cylindrical optical member with an upper surface thereof formed on the B direction side (without a bottom surface formed on the A direction side), and is made of transparent acrylic resin. An end portion on the A direction side of the double lens array 110 is fixed to the board for light source 105 and the base member 104. As shown in FIGS. 3 and 4, the first light guide member 106, the diffusing lens 107, and the douser 108, and the second light guide member 109 are arranged between the board for light source 105 and the upper surface of the double lens array 110.

As shown in FIG. 3, in the upper surface of the double lens array 110, lens portions 110a are formed in the same number as the number of the upright portions 109b. The lens portions 110a lie side-by-side at equal spaces along an outer circumference of the upper surface on the upper surface of the double lens array 110.

As shown in FIG. 5, the lens portions 110a are light diffusing portions to diffuse and emit the incident light. In each of the lens portions 110a, the B direction side is an outgoing surface S and the A direction side is an incident surface N. The outgoing surface S is a front surface of each of the lens portions 110a, and the incident surface N is formed on the back side of the outgoing surface S, and a back surface of the relevant lens portion 110a.

Moreover, as shown in FIGS. 4 and 5, the outgoing surface S of each of the lens portions 110a is a single spherical surface convex in the light exit direction (the B direction). In contrast, the incident surface N of each of the lens portions 110a has a form where a plurality of convex spherical surfaces (spherical surfaces smaller than the spherical surface of the outgoing surface S) in the opposite direction (the A direction) to the light incident direction are formed.

As shown in FIG. 5, for each of the LED elements 405a, one of the upright portions 109b and one of the lens portions 110a are provided at a position directed from the LED element 405a to the B direction, and the outgoing surface (the end surface) R of the relevant upright portion 109b and the incident surface N of the relevant lens portion 110a are opposed to each other with a slight clearance interposed therebetween. The outgoing surface R of the upright portion 109b is designed to be narrower than the incident surface N opposed to the outgoing surface R on the B direction side of this outgoing surface R.

As shown in FIG. 4, the light emitted from each of the LED elements 405a enters the second light guide member 109 from the incident portion 109a of the second light guide member 109, is guided straight in the B direction by the upright portion 109b located on the B direction side of the relevant LED element 405a, exits from the outgoing surface R of the upright portion 109b, and enters the lens portion 110a from the incident surface N of the lens portion 110a located on the B direction side of the relevant LED element 405a. Furthermore, the light entering the lens portion 110a is concentrated on the outgoing surface S by the plurality of spherical surfaces of the incident surface N, and the light concentrated on the outgoing surface S diffuses outside. In this manner, since the light once concentrated in the lens portion 110a is diffused, the light diffused from the lens portion 110a becomes visually pleasing.

Moreover, as shown in FIG. 3, in the upper surface of the double lens array 110, through-holes 110b penetrating from the A direction side to the B direction side are formed. Contours of the through-holes 110b have the same shapes as the contours of the through-holes 107a. That is, the contours of the through-holes 110b have the same letter shapes as the letter shapes of the cross sections of the upright portions 106b and the outgoing surfaces M of the first light guide member 106, and areas thereof are made slightly larger than those of the cross sections of the upright portions 106b so as to fit the upright portions 106b in a state having play. As shown in FIG. 4, the upright portions 106b of the first light guide member 106 are fitted in the through-holes 110b so that the outgoing surfaces M of the upright portions 106b of the first light guide member 106 are projected on the B direction side from the through-holes 110b. The upright portions 106b of the first light guide member 106 are fitted in the through-holes 110b of the double lens array 110 in a state having play with respect to the double lens array 110 without being caused to adhere to the double lens array 110 with an adhesive or the like.

Moreover, as shown in FIG. 4, the cover 111 is fixed to the case 101 so that the upper surface of the cover 111 and the outgoing surfaces S of the lens portions 110a on the upper surface of the double lens array 110 are opposed to each other, and the upper surface of the cover 111 and the outgoing surfaces M of the first light guide member 106 are opposed. This allows the first light guide member 106, the diffusing lens 107, the douser 108, the second light guide member 109, and the double lens array 110 to be arranged between the upper surface of the cover 111 and the board for light source 105.

According to the above-described configuration, as shown in FIG. 4, the light of the LED elements 205a is guided in the B direction by the first light guide member 106 without going through the diffusing lens 107 and the double lens array 110, and exits from the outgoing surfaces M of the first light guide member 106 on the B direction side with respect to the double lens array 110 to be emitted outside through the cover 111. Moreover, the light of the LED elements 305a, after being diffused by the diffusing lens 107, is emitted outside through the cover 111. Furthermore, the light of the LED elements 405a is guided by the second light guide member 109 in the B direction, is once concentrated in the lens portions 110a (refer to FIG. 5) of the double lens array 110 and then diffused to be emitted outside through the cover 111.

Hereinafter, advantages of the double lens array 110 will be described. As described before, the push button device 10 of the present embodiment includes the third light source portion 405 and the double lens array 110. As shown in FIGS. 4 and 5, the double lens array 110 is formed with the one or more lens portions 110a each made up of the outgoing surface S on the front side and the incident surface N on the back side. Light emitted from the third light source portion 405 enters from the incident surface N, and the incident light exits outside from the outgoing surface S. Furthermore, the configuration is such that in the outgoing surface S of each of the lens portions 110a, the single spherical surface that is convex in the light exit direction is formed. Also, in the incident surface N of each of the lens portions 110a, the plurality of spherical surfaces that are convex reverse to the light incident direction and are smaller than the spherical surface of the outgoing surface S are formed.

According to the above-described configuration, as shown in FIGS. 4 and 5, the light entering the lens portion 110a from the incident surface N is concentrated on the outgoing surface S by the plurality of spherical surfaces of the incident surface N, and the light concentrated on the outgoing surface S diffuses outside. In this manner, since the light once concentrated by the lens portion 110a is diffused, the irradiated light from the lens portion 110a can be made visually pleasing even with the light source of low luminance, without using a light source of high luminance.

The outgoing surface S of the lens portion 110a is not limited to the spherical shape, as long as it has a form of being convex in the light exit direction and diffusing the light in the exit direction, and for example, it may be aspherical. However, in order to enhance a light diffusion function in the outgoing surface S, it is preferable that the outgoing surface S is spherical as in the present embodiment. Moreover, the incident surface N of the lens portion 110a is not limited to the spherical shape of the convex portions, as long as the incident surface N has a form in which a plurality of convex portions convex in the light exit direction are formed, and the light is concentrated in the incident direction. For example, the relevant convex portions may be aspherical. However, in order to enhance a light concentration function in the incident surface N, it is preferable that the convex portions formed in the incident surface N are spherical as in the present embodiment.

Moreover, as shown in FIGS. 3 to 5, the push button device 10 of the present embodiment has the second light guide member 109 to receive and guide the light emitted from the third light source portion 405, in the second light guide member 109, the upright portions 109b extending toward the incident surfaces N of the lens portions 110a are formed, and the upright portions 109b each have the outgoing surface (the end surface) R that is opposed to the incident surface N of each of the lens portions 110a to emit the light to the incident surface N. The outgoing surface R of each of the upright portions 109b is narrower than the incident surface N opposed to the relevant outgoing surface R.

According to this configuration, the light exiting from the outgoing surface R of the upright portion 109b of the second light guide member 109 can be diffused to the whole incident surface N, and an amount of light leaking without entering the incident surface N can be restrained. As a result, the light emitted from the third light source portion 405 and entering the second light guide member 109 can be effectively used, so that the irradiated light can be made more visually pleasing even with the light source of low luminance.

Next, advantages of the first light guide member 106 and the diffusing lens 107 will be described. As described before, the push button device 10 of the present embodiment includes the board for light source 105, the first light source portion 205 and the second light source portion 305, the first light guide member 106, and the diffusing lens 107.

The diffusing lens 107 is of the dome type with the convex front surface and the concave back surface, and is arranged so that the back surface is opposed to the board for light source 105. The first light source portion 205 and the second light source portion 305 are mounted on the side opposed to the diffusing lens 107 in the board for light source 105. The first light guide member 106 is fitted in the through-holes 107a formed in the diffusing lens 107 so as to penetrate from the side of the back surface of the diffusing lens 107 to the side of the front surface thereof, and is mounted on the board for light source 105 so that the one end side thereof covers the first light source portion 205, and the other end side thereof is projected to the B direction with respect to the diffusing lens 107 (in the direction from the back surface to the front surface of the diffusing lens 107).

The light of the second light source portion 305 enters the diffusing lens 107 from the back surface of the diffusing lens 107 and is diffused from the front surface of the diffusing lens 107, thereby being irradiated outside. In contrast, the light of the first light source portion 205 enters the first light guide member 106 from the incident portion 106a opposed to the first light source portion 205 on the one end side of the first light guide member 106, is guided inside the first light guide member 106, and exits from the outgoing surfaces M on the other end side of the first light guide member 106, thereby being irradiated outside.

According to the above-described configuration, the light of the second light source portion 305 diffusely exits from the front surface of the diffusing lens 107, thereby being irradiated outside, while the light of the first light source portion 205 is guided by the first light guide member 106 and exits from the outgoing surfaces M of the first light guide member 106, thereby being irradiated outside.

Furthermore, according to the above-described configuration, since the first light source portion 205 is covered with the board for light source 105 and the first light guide member 106, the light of the first light source portion 205 can be restrained from leaking between the first light guide member 106 and the board for light source 105, and a situation can be prevented in which the light of the first light source portion 205 is mixed with the light emitted from the second light source portion 305 and reaches the diffusing lens 107. Moreover, since the light emitted from the second light source portion 305 can be restrained from entering between the first light guide member 106 and the board for light source 105, a situation can be prevented in which the light of the second light source portion 305 is mixed with the light entering the first light guide member 106 from the first light source portion 205. In this manner, since the light of the first light source portion 205 and the light of the second light source portion 305 can be restrained from being mixed, there is an effect that for a viewer of the push button device 10, an area where the light from the first light source portion 205 is irradiated and an area where the light from the second light source portion 305 is irradiated in the push button device 10 can be clearly distinguished. This brings an advantage that forming the outgoing surfaces M on the B direction side of the first light guide member 106 into the predetermined shapes (i.e., the letter shapes in the present embodiment) enables the predetermined shapes to be clearly shown to the user. For example, a color of the light of the pair of the LED elements 305a of the second light source portion 305 may be made the same, and a color of the light of the three LED elements 205a of the first light source portion 205 may be made different from the color of the light of the LED elements 305a of the second light source portion 305. This differentiates the color of the light emitted from the outgoing surfaces M in the predetermined shapes of the first light guide member 106 from the color of the light diffused in the diffusing lens 107 around the first light guide member 106, thereby enabling the user to clearly recognize the predetermined shapes. As long as the color of the light of the three LED elements 205a of the first light source portion 205 are different from the color of the light of the LED elements 305a of the second light source portion 305, the three LED elements 205a may be the same or different from one another in color. Moreover, as the aforementioned predetermined shapes, letter shapes, decorative shapes other than characters (e.g., a star shape and the like), a contour of a character employed in the pachinko machine 1, and the like may be used. However, in the present embodiment, the aforementioned predetermined shapes are the letter shapes. Specifically, the first light guide member 106 of the present embodiment has the incident portion 106a formed on the A direction side to cover the LED elements 205a of the first light source portion 205, and the columnar upright portions 106b extending from the incident portion 106a to the B direction side of the first light guide member 106, the end portions on the B direction side of the upright portions 106b are the outgoing surfaces M, and the cross sections of the upright portions 106b and the outgoing surfaces M have the same letter shapes. This can emphasize the relevant letter shapes by emitting the light of the first light source portion 205 from the letter-shaped outgoing surfaces.

Moreover, according to the present embodiment, since even when a douser is not attached between the first light source portion 205 and the second light source portion 305, as described before, leakage of the light of the second light source portion 305 to the light path of the first light source portion 205 and leakage of the light of the first light source portion 205 to the light path of the second light source portion 305 can be restrained, there is an effect that as compared with the configuration of Japanese Unexamined Patent Publication No. 2010-33860, parts count can be reduced.

Furthermore, the outgoing surfaces M of the first light guide member 106 of the present embodiment are subjected to surface embossing processing. Since the outgoing surfaces subjected to the embossing processing have an effect of diffusing the light, there is exerted an effect that the letter-shaped outgoing surfaces M can be emphasized to the user.

Moreover, in the present embodiment, the upright portions 106b of the first light guide member 106 are fitted in the through-holes 107a of the diffusing lens 107 and the through-holes of the double lens array 110 without being caused to adhere to the diffusing lens 107 and the double lens array 110. In other words, the upright portions 106b are fitted in the through-holes of the diffusing lens 107 and the through-holes of the double lens array 110 in the state having play with respect to the diffusing lens 107 and the double lens array 110. In this manner, when the upright portions 106b are simply fitted in the diffusing lens 107 and the double lens array 110 without adhering thereto, the situation can be further prevented that the light emitted from the second light source portion 305 enters the first light guide member 106. A reason for this is as follows. If the upright portions 106b and the double lens array 110 are caused to adhere to each other in the through-holes 110b of the double lens array 110 with an adhesive, or if the upright portions 106b and the diffusing lens 107 are caused to adhere to each other in the through-holes 107a of the diffusing lens 107 with an adhesive, a situation may occur that the light emitted from the second light source portion 305 enters the first light guide member 106 through an adhesive layer formed by the adhesive, while, when they are not caused to adhere, the situation does not occur.

The present invention can be used in a game machine such as a pachinko machine, a pachinko slot machine and the like.

According to the illumination-type push button device of the present invention, while restraining the leakage of the light of the second light source portion to the light path of the first light source portion and the leakage of the light of the first light source portion to the light path of the second light source portion, the parts count can be reduced as compared with the configuration in the related art.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. An illumination-type push button device configured to be attached to a game machine, comprising:
    a board for light source;
    a diffusing lens having a dome shape with a convex front surface and a concave back surface, the back surface being opposed to the board for light source;
    a first light source portion and a second light source portion mounted on a side opposed to the diffusing lens of the board for light source; and
    a light guide member that is fitted in a through-hole formed in the diffusing lens so as to penetrate from a side of the back surface to a side of the front surface, is mounted on the board for light source so that one end side thereof covers the first light source portion, and is projected from the diffusing lens on another end side in a direction from the back surface to the front surface,
    wherein the diffusing lens is configured such that light of the second light source portion enters the diffusing lens from the back surface, and is diffused from the front surface of the diffusing lens, thereby being irradiated to an outside of the device, and
    the light guide member is configured such that light of the first light source portion enters the light guide member from an incident surface opposed to the first light source portion on the one end side of the light guide member to be guided inside the light guide member, and exits from an outgoing surface on the other end side of the light guide member, thereby being irradiated to the outside.

2. The illumination-type push button device according to claim 1,
    wherein the light guide member comprises an incident portion that is formed on the one end side and covers the first light source portion, and a columnar upright portion extending from the incident portion to the other end side,
    an end portion of the upright portion on the other end side is the outgoing surface, and
    the outgoing surface and a cross section of the upright portion comprises a same letter shape.

3. The illumination-type push button device according to claim 2, wherein the outgoing surface comprises surface embossing processing.

* * * * *